United States Patent

[11] 3,580,351

| [72] | Inventor | Ignatius J. Mollen<br>Brillion, Wis. |
|---|---|---|
| [21] | Appl. No. | 789,555 |
| [22] | Filed | Jan. 7, 1969 |
| [45] | Patented | May 25, 1971 |
| [73] | Assignee | Ariens Company<br>Brillion, Wis. |

[54] SELF-PROPELLED GARDEN TRACTOR VEHICLE
7 Claims, 10 Drawing Figs.

[52] U.S. Cl. ................................................. 180/53D,
37/43E, 74/194, 180/19R, 180/70R
[51] Int. Cl. ..................................................... B60k 17/28,
B60k 25/00
[50] Field of Search........................................... 180/19,
53.6, 70

[56] References Cited
UNITED STATES PATENTS
2,770,894  11/1956  Gettleman................... 180/53(.6)UX
2,823,507  2/1958  Cooper et al. ................. 180/19X
2,829,723  4/1958  Kelsey.......................... 180/53(.6)
2,941,610  6/1960  Clemson....................... 180/19

*Primary Examiner*—A. Harry Levy
*Attorney*—Wheeler, House & Wheeler

ABSTRACT: Separate power-delivery trains actuate a power take off from the crankshaft and a variable ratio drive from the half-speed cam shaft to the wheels.

The drive to the wheels is a friction drive normally disengaged and controlled by a "dead man's grip." When disengaged, the driven disc is freely movable between any of its various positions transversely of the driving disc, thereby providing for plural speeds forward and/or reverse, and for neutral. Means prevents axial movement of the driving disc into contact with the driven disc in the neutral position of the latter.

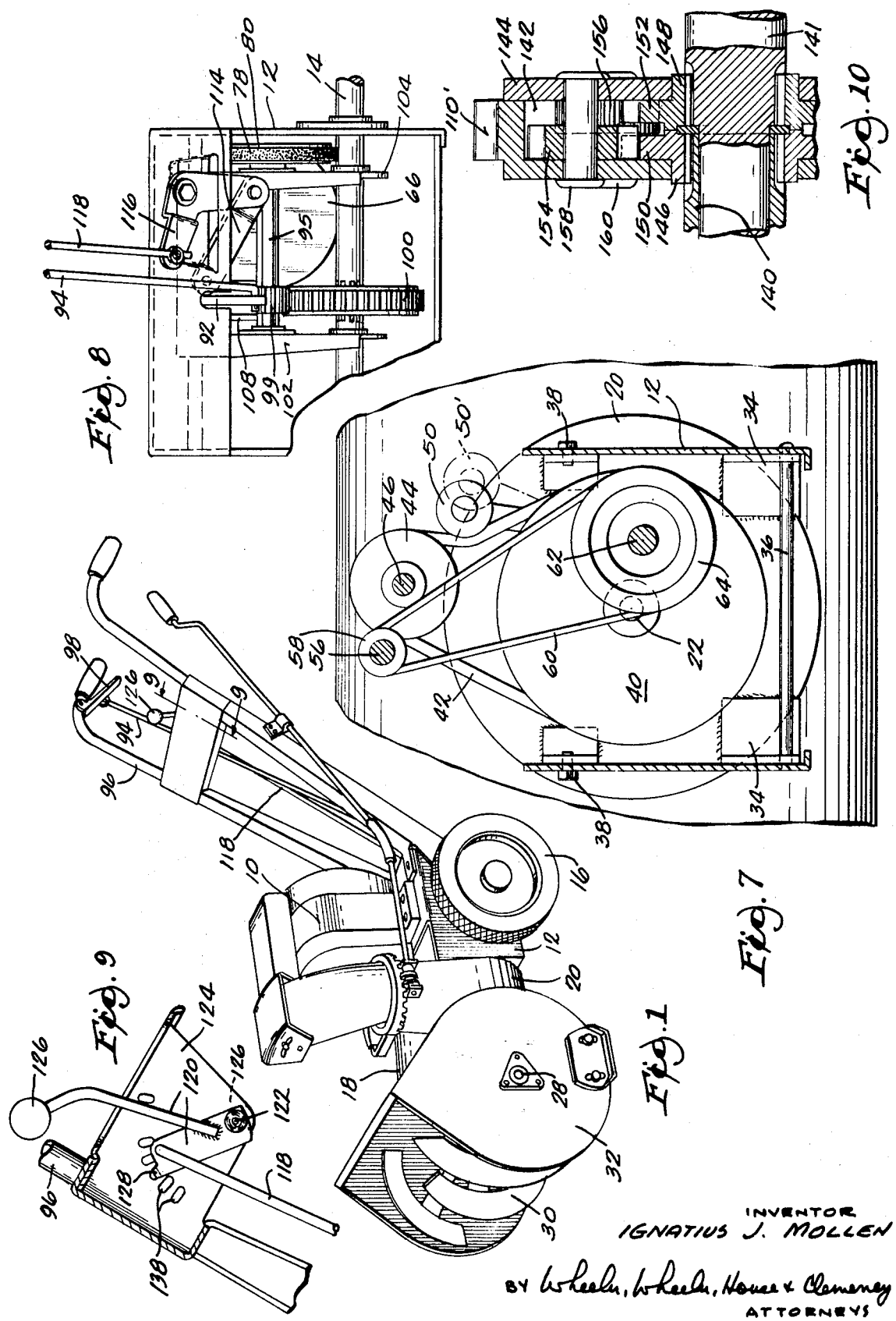

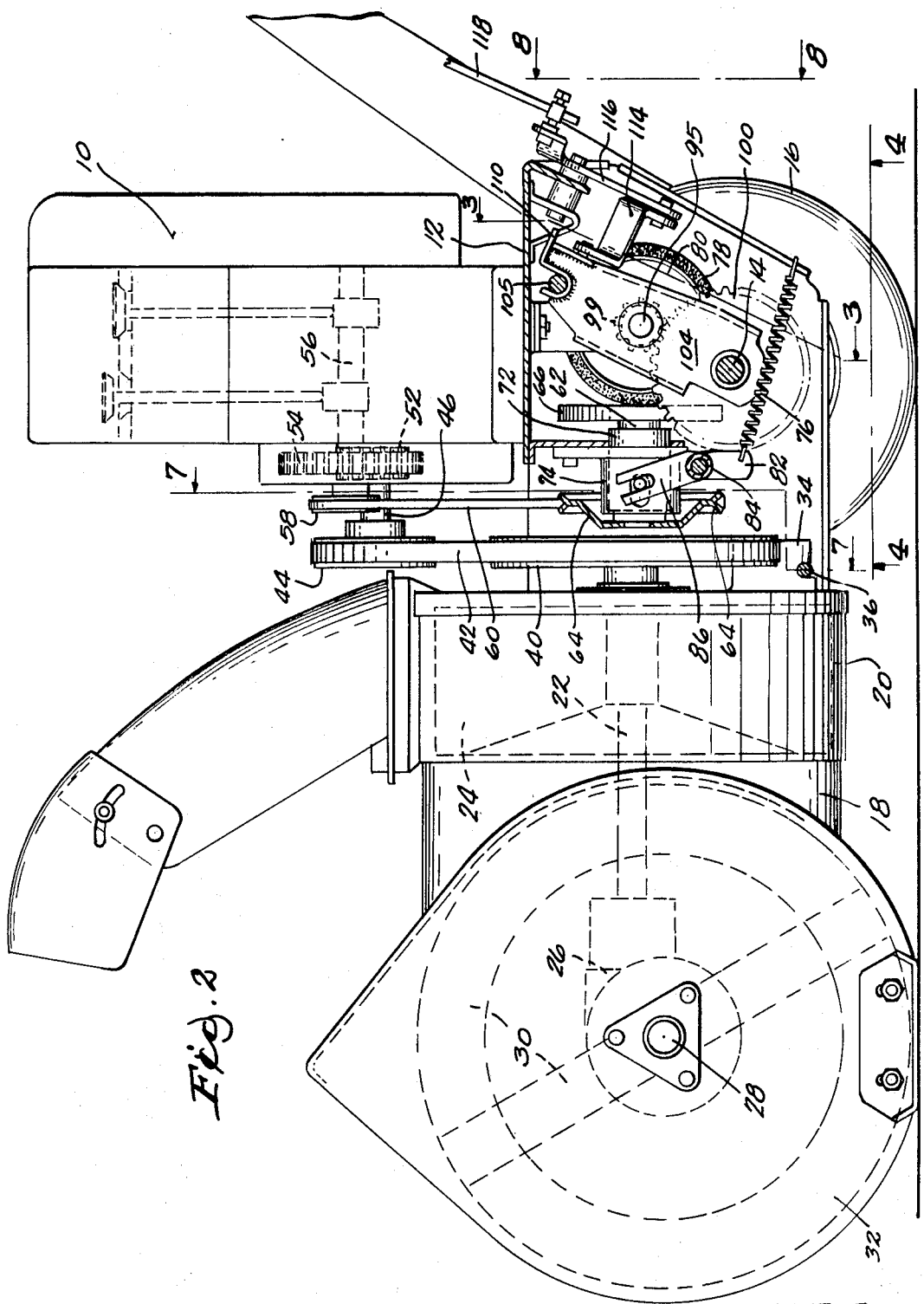

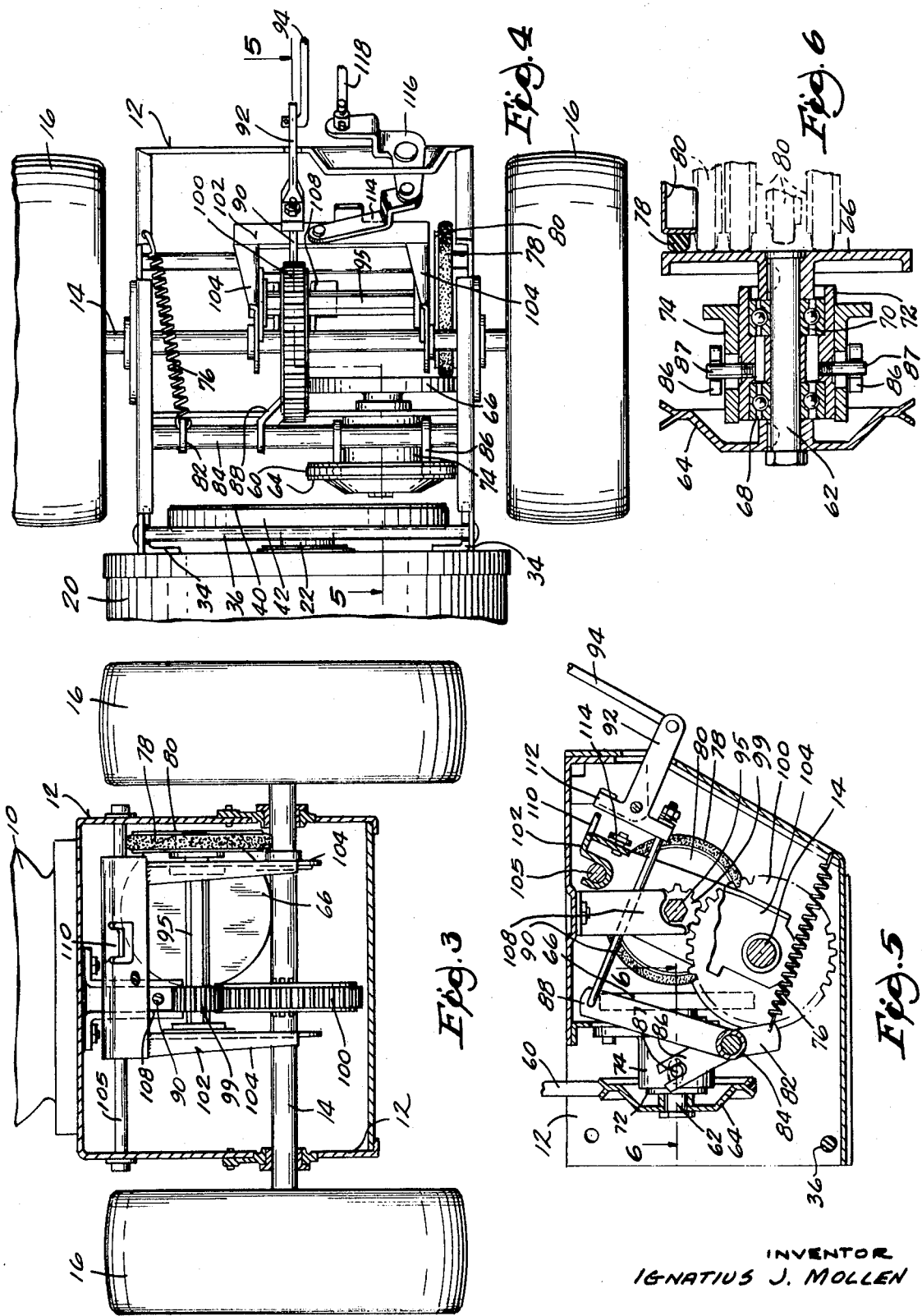

SELF-PROPELLED GARDEN TRACTOR VEHICLE

BACKGROUND OF THE INVENTION

Normally, the engine powering a manually guided tractor of the type disclosed has a motion transmitting train leading to the wheels and comprising special reduction gearing of relatively high ratio. With the instant tractor a part of the reduction gearing to the rate changer is eliminated by using heavy reduction gearing to drive the cam shaft, which inherently is operated at half the crankshaft speed and which, by the use of heavy parts can transmit motion to drive the bull wheels of the tractor.

Other tractors using variable speed friction drive usually have the friction drive mechanism normally engaged. In this instance, the drive through the variable speed transmission is normally disengaged so that in the event that anything happens to the operator, or his attention is directed elsewhere, the device will tend to stop.

To avoid unnecessary wear in variable speed friction transmission, it is quite common to use a rotating center insert on the driving disc and with which the periphery of the driven disc becomes engaged in the neutral position. In this instance, no engagement of any kind is possible in the neutral position, there being a stop which holds the driving disc retracted out of contact with the driven disc when the driven disc is on center.

As shown, the device is used to propel and to power a snow blower which includes a gathering screw-type feeder, and a high-speed centrifugal discharge wheel that receives snow from the feeder and hurls it in a selected direction. However, the power takeoff from the crankshaft of the basic tractor mechanism can be sued for driving other implements or garden tools.

SUMMARY OF INVENTION

As indicated in general terms above, the invention contemplates a combination in which a manually guided tractor has a power takeoff shaft driven at relatively high speeds directly from the engine crankshaft and it has heavy-duty reduction gearing between the crankshaft and the camshaft whereby not only to operate the camshaft at the required half speed but to minimize or eliminate any additional speed reducing gearing to drive the bull wheels through a variable ratio friction drive device.

The friction drive includes a unitary assembly including a driving disc rotatable in a bearing unit bodily reciprocable on a fore and aft axis and normally biased toward a retracted position from which it is manually advanced into engagement with the periphery of a driven wheel or disc adjustable on a transverse shaft to a position of selected radius respecting the driving disc, there being means which obstructs the manual advance of the driving disc into engagement with the driven disc when the latter is on center.

DESCRIPTION OF DRAWINGS

FIG. 1 is a view in perspective showing a snow blower-equipped manually guided tractor embodying the invention.

FIG. 2 is an enlarged fragmentary detail view partially in side elevation and partially in longitudinal section through the tractor and snow blower equipment of FIG. 1.

FIG. 3 is a fragmentary view taken in section on the line 3-3 of FIG. 2.

FIG. 4 is a fragmentary bottom plan view looking upwardly from the viewpoint of the line 4-4 of FIG. 2.

FIG. 5 is a fragmentary detail view taken in section on the line 5-5 of FIG. 4.

FIG. 6 is a detail view taken in section on the line 6-6 of FIG. 5.

FIG. 7 (sheet 1) is a view taken in section on the line 7-7 of FIG. 2.

FIG. 8 is a fragmentary detail view in rear elevation from the viewpoint of the line 8-8 of FIG. 2.

FIG. 9 (sheet 1) is a view taken in section on an enlarged scale on the line 9-9 of FIG. 1.

FIG. 10 is a fragmentary enlarged diagrammatic sectional view of a differential mechanism optionally incorporated in the gear which drives the bull wheels.

DESCRIPTION OF PREFERRED EMBODIMENT

In the particular embodiment illustrated, the tractor is powered by an engine 10 mounted on a frame 12 which has a transverse shaft 14 carrying driving or bull wheels 16. The tractor takes power from its crankshaft to drive an implement, here constituting a snow-blowing device having a subframe 18 equipped with blower housing 20. Within this housing is journaled a shaft 22 carrying the blower 24. This shaft extends in a fore and aft direction toward a gear set 26 which drives the shaft 28 of a snow-gathering device 30 in the housing 32. The subframe 18 has notched ears 34 detachably engaged with a cross rod 36 on the main frame. Engagement of the subframe with the main frame is maintained by the screws 38 as best shown in FIG. 7. By releasing those screws and lifting the subframe from the cross rod 36, the snow blower may be detached and replaced in like manner by some other attachment.

The shaft 22 of the snow blower (and corresponding shaft of some other attachment) may be provided with a pulley 40 connected by belt 42 with pulley 44 on the engine crankshaft 46 (FIG. 2). When in operation, the parts so driven from this power takeoff arrangement function at a speed which is always in fixed ratio relation to the crankshaft speed and is a much higher speed than that required for the actuation of the bull wheels 16 that advance the assembly over the earth.

Transmission of motion between the crankshaft 48 and the driven pulley 40 is controlled by an idler 50 movable between the full line position of FIG. 7 for motion transmission, and the retracted position shown in dotted lines at 50' in which the belt 42 is slack to allow the driven shaft 22 and the blower and snow gathering auger 30 to come to rest.

Instead of using separate multiple gear reduction devices to drive the bull wheels, the instant device achieves an initial 2 to 1 reduction by using the camshaft drive. For this purpose, power transmission from the crankshaft occurs through a relatively heavy gear 52 meshing with a gear 54 on the camshaft 56. It will be observed that the pulley 58 on the camshaft drives the propulsion belt 60 at a speed which is much slower than that of the power takeoff belt 42 and is independent of the operation or neutralization of power transmission through the power takeoff belt 42.

Mounted to extend fore and aft in the tractor frame 12 is a drive shaft 62 which carries a pulley 64 about which the transmission belt 60 is trained. The drive shaft 62, with pulley 64 on one end and the driving friction disc 66 on its other end, is mounted on the inner races of bearings 68 and 70. These bearings have their outer races carried by bushing 72 which is nonrotatable but axially shiftable through the bearing sleeve 74, as best viewed in FIG. 6. The bushing 72 and the respective bearings 68 and 70, the shaft 62, pulley 64 and disc 66 are movable axially as a unit between a normally retracted position to which the unit is biased by the spring 76 (FIG. 5) and an advanced position in which the driving disc 66 is engaged with an elastomeric ring 78 on the periphery of the driven wheel or disc 80 as shown in FIGS. 3 to 6. FIG. 5 illustrates the parts in a position in which the driving disc 66 is disengaged from the ring 78 of the driven disc 80. The other views show the wheel or driven disc adjusted along its shaft to one or another of the positions in which the bull wheel shaft 14 is being driven either forwardly or in reverse.

The spring 76 which biases the driving unit to its retracted position is mounted on an arm 82 of a rock shaft 84 which has shipping arms 86 engaged with pins 87 which project from the nonrotating bushing 72 diametrically through slots in the stationary sleeve 74 as best shown in FIGS. 5 and 6. The rock shaft 84 has another arm at 88 connected by links 90 and lever 92 with a link 94 which extends upwardly along the guide handles 96 to the "dead man's" grip 98. It takes affirmative pressure on this grip to maintain a drive to the bull wheels by urging the driving disc 66 into contact with the tire 78 on the periphery of driven wheel 80.

The rate of drive will depend on the drive ratio determined by the radius at which the driven disc 80 is positioned outwardly from the axis of the shaft 62 on which the driving disc 66 is mounted. Forward or reverse movements are achieved by moving the driven disc to one side or the other of such axis after pressure on the grip 98 is first relaxed to permit automatic retraction of the driving disc 66 under bias of spring 76. The driven disc is mounted on polygonal shaft 95 to move axially therewith (FIGS. 3, 4 and 5). Splined on that shaft is a gear 99 meshing with a driven gear 100 on the bull wheel shaft 14. A yoke 102 is provided which has bearings for the shaft 95 and has arms 104 guided on shaft 14 and also on cross rod 105 (FIG. 5). Manipulation of the yoke moves disc 80 and polygonal shaft 95 unitarily to position disc 80 at a desired position opposite the face of driving disc 66. In any position of the unit the shaft 95 remains coupled to gear 99. This gear has a hub mated to the shaft 95, gear 99 being anchored against axial movement by the fixed fork 108 attached to the frame 12 (FIG. 3).

The disc 80 is, in effect, a rubber-tired wheel. During normal shifting movement, there is no contact whatever between the driving disc 66 and the driven disc or wheel 80. It is only when the driving disc is forced into contact with the elastomeric ring or tire 78 on driven disc 80 against the bias of spring 76 by the exercise of pressure on the "dead man's grip" 98 that motion is transmitted. Such contact is to be avoided when the driven disc 80 is centered with respect to the axis of shaft 62 on which driving disc 66 is mounted. If the discs were engaged in this relative position, the elastomeric ring 78 would be subjected to torsional destructive friction. Accordingly, the yoke 102 is provided with a stop 110 which, in the position of the parts shown in FIG. 5, is moved into the path of the arm 112 of lever 92 to prevent the oscillation of such lever to a position in which the driving and driven disc will be engaged. In all other positions of yoke and the driven disc, engagement will occur when the driving disc is manually advanced for motion transmission as above described.

Various predetermined ratios of engagement are achieved by moving the yoke 102 by means of link 114, bellcrank 116, link 118 and lever 120 as shown in FIGS. 8 and 9. Lever 120 is loosely pivoted on a pintle 122 and is held flat against plate 124 by a spring 126 encircling the pintle as shown only in dotted lines as shown in FIG. 9.

When the handle portion 126 of lever 120 is manipulated to release the finger 128 from any hole 138 in which such finger is engaged, the lever may be oscillated about its pintle to move the finger 128 into engagement with a different aperture 138 to achieve a different forward or reverse drive to shaft 14 and bull wheels 16.

When the tractor bull wheels 16 propel snow blowing apparatus, it is unneccessary to provide differential gearing therebetween. However, when the propulsion unit is employed to power other apparatus, a differential may be desirable. By way of example, FIG. 10 shows the driving gear 110' equipped with differential mechanism, the two bull wheel shafts 140 and 141 being differentially driven therefrom. The gear 110' has an interior cavity 142 closed by a face plate 144. The gear is supported on the hubs 146 and 148 of the differentially driven gears 150 and 152 respectively. These gears mesh with respective planetary pinions 154 and 156 which are circumferentially offset and mesh with each other, being rotatable on respective cross-shafts 158 and 160. The gear 150 meshes with pinion 154 and the gear 152 meshes with pinion 156. This accommodates differential movement between the shafts 140 and 141 on which the gears 150 and 152 are respectively mounted.

I claim:

1. A manually guided tractor vehicle having a guide handle and an engine with a crankshaft and a camshaft, and reduction gearing for transmitting motion between the crankshaft and the camshaft, said vehicle comprising the combination therewith of power takeoff means connected with the crankshaft, driving bull wheels for the vehicle, and motion transmitting connections from the camshaft to the bull wheels, the last-mentioned connections comprising a normally retracted driving clutch part and a driven clutch part, means biasing said driving clutch part to a normally retracted position in which it is out of engagement with the driven clutch part, and manually controlled means including a dead man's grip pivoted to the guide handle in a position to be within the grasp of an operator manually guiding the vehicle and having motion transmitting connections for advancing the normally retracted part into engagement with the driven clutch part and maintaining such engagement by continued pressure on said grip.

2. A tractor according to claim 1, in which a frame supports said engine and is provided with bearings for a bull wheel shaft, a bull wheel shaft in said bearing provided with a driven gear, a jackshaft provided with a driving gear meshing with the driven gear, said driven clutch part including an elastomerically tired friction wheel operatively connected with the driving gear on the jackshaft, said friction wheel being adjustable axially of the jackshaft and parallel to the bull wheel shaft, a friction drive shaft extending substantially fore and aft on said frame, said motion transmitting connections from the camshaft to the bull wheels including means connecting said friction transmission shaft with said camshaft, said driving clutch part includes friction driving disc having means supporting it on the friction drive shaft for movement in the direction of the axis of said drive shaft and coupled for rotation therewith, said disc having a face engageable with the periphery of the elastomerically tired wheel for the transmission of motion to the jackshaft, said biasing means including a spring biasing said disc toward its said retracted position, said manually controlled means including said dead man's grip and said motion transmitting train advancing said disc against the bias of said spring upon continued pressure on said grip, a motion transmitting train for adjusting the elastomerically tired wheel along the jackshaft between various positions offset from the axis of the friction drive shaft, and interlocking stop means comprising parts on the respective motion transmitting trains aforesaid for preventing the movement of the face of the friction drive disc into engagement with the periphery of the elastomerically tired wheel when the periphery of said wheel is substantially centered with respect to the axis of said disc. 15

3. A tractor according to claim 1, in which the jackshaft and the elastomerically tired wheel are unitarily movable, the jackshaft being splined with respect to the gear which meshes with the bull wheel shaft gear, and means for holding against axial movement the said gear which meshes with the bull wheel shaft gear.

4. A manually guided tractor vehicle having an engine with a crankshaft and a camshaft, and reduction gearing for transmitting motion between the crankshaft and the camshaft, said vehicle comprising the combination therewith of power takeoff means connected with the crankshaft, driving bull wheels for the vehicle, and motion transmitting connections from the camshaft to the bull wheels, the motion transmitting connections including a rotary driving friction element with a friction face, a rotary driven friction element with a peripheral elastomeric tire, means mounting the driving friction element for advancing movement toward engagement with the tire of driven friction element, the said elements having their axes at an angle such that the periphery of the driven friction element is engaged by said face of the driving friction element when the latter is advanced, means for biasing the driving friction element toward a retracted position in which its said face is out of engagement with driven friction element, and means for adjusting the driven friction element between various positions offset radially from the axis of the driving friction element whereby to vary the ratio of motion transmission between said elements.

5. A tractor according to claim 4 in which a stop is positioned in the path of said last-mentioned means at a point such as to obstruct movement of the driving friction element into contact of its face with the periphery of the driven friction element when the latter is substantially coincident with the axis of the driving friction element.

6. A tractor according to claim 5, in which means provided for mounting the driven friction element comprises a yoke, means supporting the yoke for movement along the axis of the driven friction element, a shaft upon which the driven friction element is mounted and which is connected with the yoke for movement therewith, a gear with respect to which said shaft moves axially and which is constrained for rotation with said shaft, means for holding the gear against axial movement with the shaft, and a second gear with which said first-mentioned gear meshes and which has a driven shaft upon which it is mounted and to which said bull wheels are connected.

7. A tractor according to claim 5, in which the means mounting the driving friction element comprises a shaft to which such element is attached, whereby said last-mentioned shaft moves bodily with the driving friction element, bearings on the shaft having outer races positioned in a bushing, a fixed sleeve through which said bushing and bearings are axially movable with said shaft and driving element, and a shipping fork having connection with said bushing through said sleeve for controlling the position of the bushing and sleeve, the said shaft having a pulley movable therewith which constitutes a part of the motion transmitting connection from the camshaft to the bull wheels.